United States Patent
Tsuboki et al.

(10) Patent No.: US 6,810,469 B2
(45) Date of Patent: Oct. 26, 2004

(54) STORAGE SYSTEM AND METHOD FOR DATA TRANSFER BETWEEN STORAGE SYSTEMS

(75) Inventors: Masanao Tsuboki, Tokyo (JP); Masamitsu Takahashi, Tokyo (JP); Katsunori Nakamura, Tokyo (JP); Takahiko Takeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 75 days.

(21) Appl. No.: 09/922,462

(22) Filed: Aug. 3, 2001

(65) Prior Publication Data

US 2002/0062429 A1 May 23, 2002

(30) Foreign Application Priority Data

Nov. 17, 2000 (JP) ........................................ 2000-355636

(51) Int. Cl.[7] .............................................. G06F 12/00
(52) U.S. Cl. ........................ 711/159; 711/112; 711/162; 707/204
(58) Field of Search ................................. 711/159, 161, 711/162, 165, 112, 114, 154; 707/200, 204

(56) References Cited

U.S. PATENT DOCUMENTS

| | | | | |
|---|---|---|---|---|
| 5,652,857 A | * | 7/1997 | Shimoi et al. | 711/113 |
| 5,809,511 A | * | 9/1998 | Peake | 707/204 |
| 6,366,987 B1 | * | 4/2002 | Tzelnic et al. | 711/162 |
| 6,643,667 B1 | * | 11/2003 | Arai et al. | 707/200 |

* cited by examiner

*Primary Examiner*—Pierre M. Vital
(74) *Attorney, Agent, or Firm*—Townsend and Townsend and Crew LLP

(57) ABSTRACT

There is realized a storage system which can reduce the limitation of a device number used by a host CPU at the time of duplexing data. A micro processor of a source external storage controller unit unifies a plurality of write data received from the host CPU to the same data bus to provide one unit of data transmitting to a target storage system. A number not dependent on the device number used when the host CPU specifies a device is allocated to this. Then, the source external storage controller unit sends the write data to the target external storage controller unit. This can receive/send the data without depending on the target specifying device number.

4 Claims, 4 Drawing Sheets

STORAGE SYSTEM AND METHOD FOR DATA TRANSFER BETWEEN STORAGE SYSTEMS

CROSS REFERENCE TO RELATED APPLICATION

This application is related to claims priority from Japanese Application No. 2000-355636, filed Nov. 17, 2000.

BACKGROUND OF THE INVENTION

1. Field of the Invention

The present invention relates to a storage system connected to a host CPU and more specifically to a storage system connected to a host CPU for writing data received from the host CPU into another storage system.

2. Description of the Prior Art

As a method for holding data used in a host CPU in a plurality of external storage device units, there is generally employed a method comprising providing source and target external storage device units holding the same data below different external storage controller units, connecting the external storage controller units not through a host CPU, and issuing by the source external storage controller unit a write request in the source external storage controller unit received from the host CPU to the target external storage controller unit so as to coincide data of the source and target external storage device units.

In this case, when the source external storage controller unit issues the write request to the target external storage controller unit, in order to identify transfer to the target external storage controller unit, a device number (a number or identifier for identifying a target logical volume) used when the host CPU issues the write request into the external storage device unit is employed directly.

On the other hand, with an increase in data processing amount in recent years, data write performance to a source external storage device unit has been required to be improved to a write request from a host CPU. As a technique related to this, there is means for performing a plurality of input/output processes to one device at the same time. Only one input/output process to one device is performed originally, and thus, a plurality of input/output processes cannot be done at the same time. Here, a device number different from the original device number is used to one device which becomes apparently a device virtually different to the write request issuer, thereby realizing multiple processing to one device.

Corresponding to the multiple processing, when the source external storage controller unit issues a write request to the target external storage device unit, a device number different from the original device number is used directly.

SUMMARY OF THE INVENTION

In the above-mentioned prior art, data input/output processing for each device is a conventionally used method by an input/output interface with the OS of a host CPU. Thus, it is effective in an aspect of holding compatibility between the source and target external storage controller units.

However, since a plurality of input/output processes are performed to one device at the same time, a device number different from the original device number is used to cause the following state in write transfer between the source and target external storage controller units. This will be described below.

A method for defining a device number different from the original device number to the same device permits multiple processing to one device, but consumes an excess device number. In other words, since the number of devices definable is finite, the substantial number of devices definable is reduced by a different device number defined. Use of the excess device number is true for write request transfer between the source and target external storage controller units. Further, in addition to the write request transfer, the transfer between the source and target external storage controller units must control the transfer and send/receive information for controlling the relation of duplexing itself between the source and target external storage controller units. This transfer needs a device number and, if possible, it is desirable to avoid consumption of an excess device number.

Furthermore, in transfer of a write request to the target external storage controller unit, a plurality of data of different target devices are processed for each device. Overhead for transfer of the transfer or reception process is caused in the respective transfer processes, resulting in lowering of performance.

An object of the present invention is to provide a transfer technique of write data from a source external storage controller unit to a target external storage controller unit in which in a process of writing the write data received from a host CPU into an external storage device unit below the target external storage controller unit, multiple processing is performed to one device so as not to be dependent on a device number thereof.

Another object of the present invention is to provide a technique for reducing overhead for transfer in which in a process of writing write data received from a host CPU into an external storage device unit below a target external storage controller unit, a target device is different.

The foregoing object is achieved so that a plurality of write data received from the host CPU to the same device are unified to one unit of data transmitting to the target storage system, a number not dependent on the device number used when the host CPU specifies a device is allocated to this, and the source external storage controller unit sends write data to the target external storage controller unit.

The foregoing another object is achieved so that a plurality of write data received from the host CPU to a different device are unified to one unit of data transmitting to the target storage system, and the source external storage controller unit sends write data to the target external storage controller unit.

DETAILED DESCRIPTION OF THE INVENTION

Embodiments of the present invention will be described in detail hereinbelow with reference to the drawings.

Figure 1:
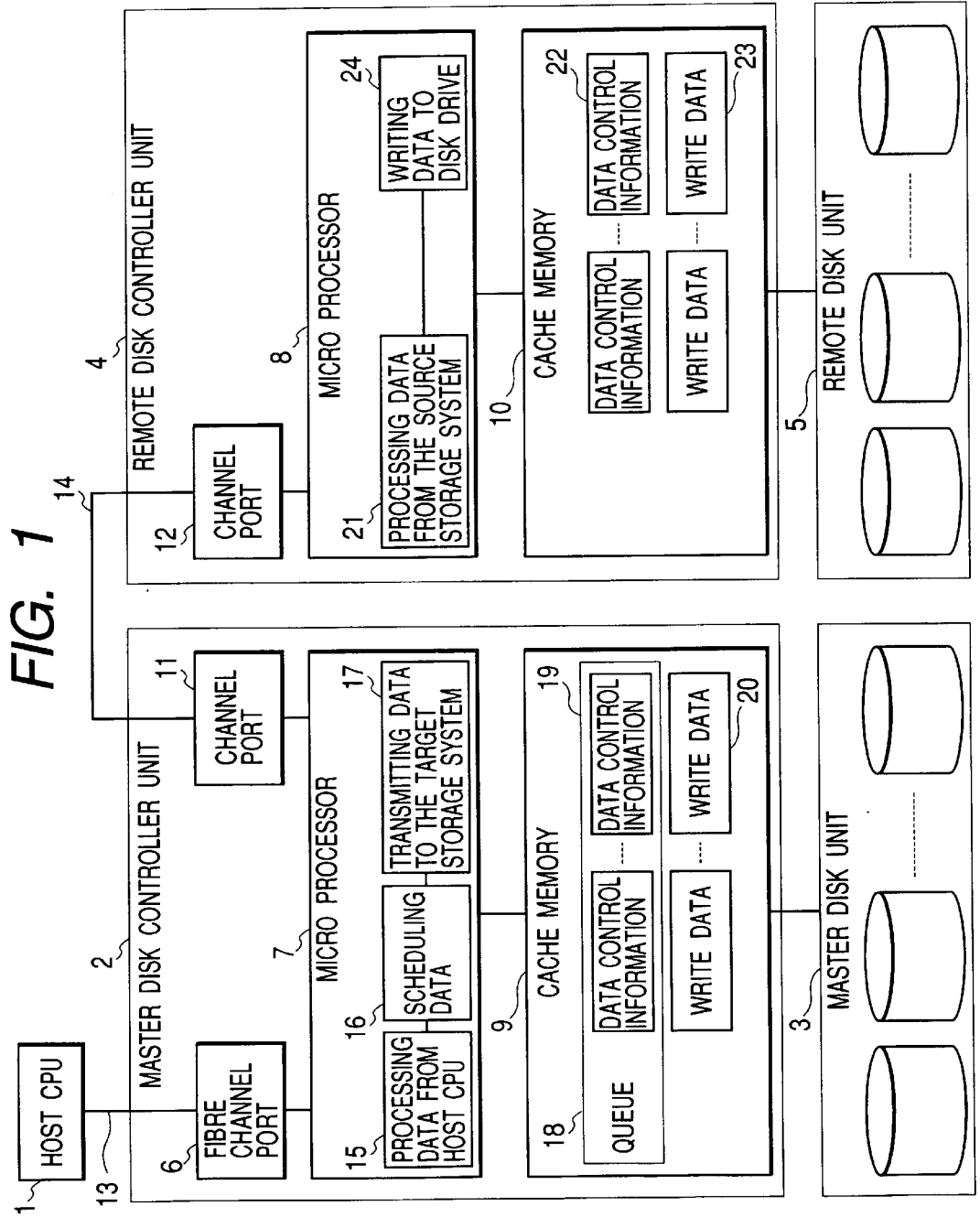
FIG. 1 shows one example of the construction of a data processing system.

FIG. 1 shows an example of the construction of a data processing system embodied by the present invention. The data processing system of the embodiment has a host CPU 1, a source storage subsystem having a master disk unit 3 for storing data from the host CPU and a master disk controller unit 2 for controlling the same, and a target storage subsystem having a remote disk unit 5 for storing duplicated data stored in the master disk unit and a remote disk controller unit 4 for controlling the same. The write data from the host CPU 1 is stored on a logical volume formed on the disk unit corresponding to a logical device number specified from the host CPU at writing.

The master disk controller unit 2 includes a fiber channel port 6 for sending and receiving data to/from the host CPU, a micro processor 7 for controlling the controller unit, a cache memory 9 for temporality storing data from the host CPU, and a channel port 11 as a communication port to the target storage subsystem. The remote disk controller unit 4 has a microprocessor 8 for controlling the controller unit, a channel port 12 as a port for communication with the source storage subsystem, and a cache memory 10 for temporarily storing data received through the channel port. The host CPU 1 and the fiber channel port 6 of the master disk controller unit 2 are connected through an interface cable 13. The channel port 11 of the master disk controller unit 2 and the channel port 12 of the remote disk controller unit 4 are connected through an interface cable 14. The interface cable 14 may be an optional information connection network, for example, SAN (Storage Area Network) or a fiber channel.

The microprocessor 7 of the master disk controller unit 2 has means of a section 15 of processing data from host CPU, a section 16 of scheduling data, and a section 17 of transmitting data to the target storage system. These three processing means are functional blocks realized by a micro program executed by the microprocessor 7. The respective operating processes will be described later. The micro processor 8 of the remote disk controller unit 4 includes a section 21 of processing data from the source storage system and a section 24 of writing data to disk drive. These two processing means 21 and 24 are functional blocks realized by a micro program executed by the microprocessor 8 incorporated by the remote disk controller unit.

Figure 2:
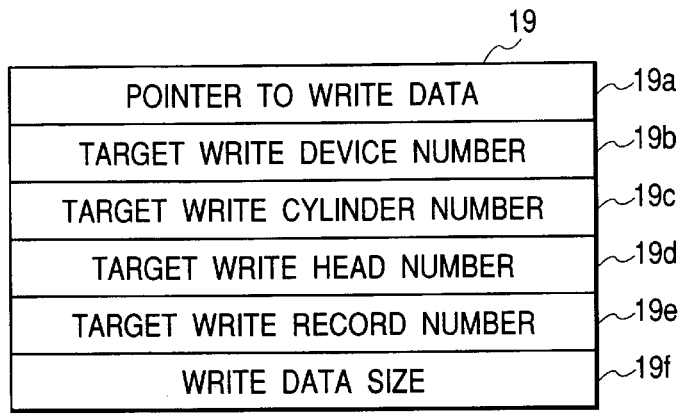
FIG. 2 shows a table managing information on write data.

With FIG. 1, the operating processing will be described in detail. The section 15 of processing data from host CPU receives write data 20 instructed from the host CPU 1, and creates in the cache memory 9 one piece of data control information 19 to one piece of the write data 20, thereby managing the same as a queue 18 and storing the same into the cache memory. The data control information 19 will be described later. The write data 20 is stored into the cache memory 9, and then, is written into a target device (logical volume) of the master disk unit 3 asynchronous to the timing at which the write data received from the host CPU. The data control information 19 will be described here. The data control information is related to the write data 20 instructed from the host CPU 1 that in what device or in what position thereof the write data is written. As illustrated in FIG. 2, the data control information has information on a pointer 19a to the position of the write data stored onto the cache memory, a target device number 19b as an identifier for identifying a target logical volume, a target cylinder number 19c, a target head number 19d, a target record number 19e, and a write data size 19f.

Figure 3:
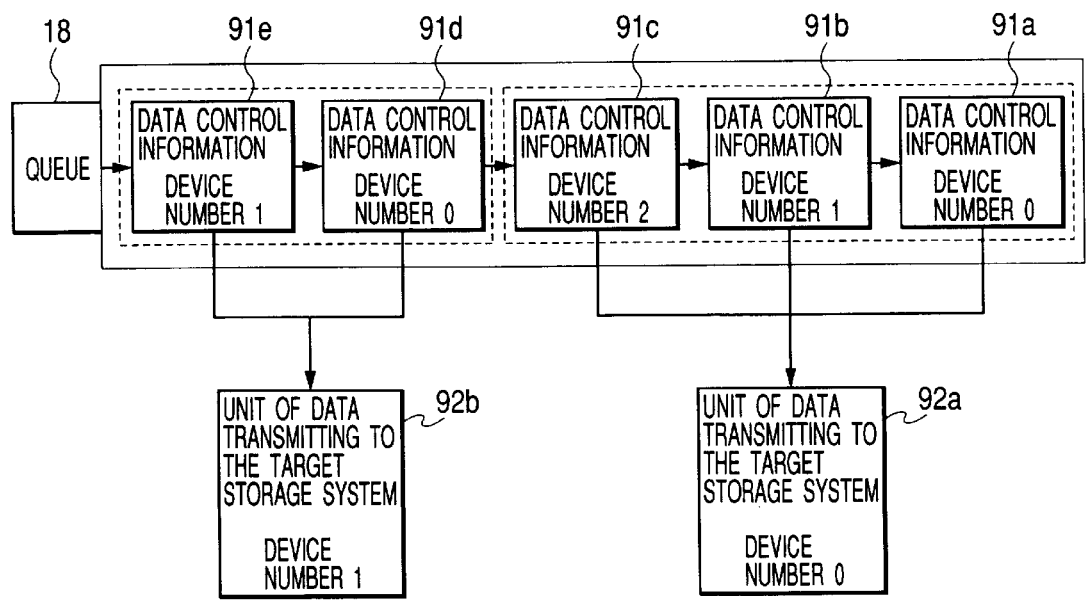
FIG. 3 shows one example of scheduling processing.

The section 16 of scheduling data checks the data control information 19 stored into the queue 18 in the cache memory 9 to judge the presence or absence of the write data 20. When the write data 20 is present, a plurality of pieces of the data control information 19 are fetched to be unified as one unit of data transmitting to the target storage system. FIG. 3 shows its example. Data control information 91a of write data to a logical volume identified by a device number 0, data control information 91b of write data to a logical volume identified by a device number 1, and data control information 91c of write data to a logical volume identified by a device number 2 are unified to a unit 92a of data transmitting to the target storage system which has a number manage system different from the manage system having the device number used when the host CPU accesses a logical volume, that is, which has a device number 0 not dependent on the device number used when the host CPU accesses a logical volume. In addition, data control information 91d of write data to a device number 0 and data control information 91e of write data to a device number 1 are unified to a unit 92b of data transmitting to the target storage system which has a number manage system different from the manage system having the device number used when the host CPU accesses a logical volume, that is, which has a device number 1 not dependent on the device number used when the host CPU accesses a logical volume. In other words, they are unified irrespective of the device number specified by the host CPU.

To change the view, a plurality of write data 20 received from the host CPU 1 are fetched sequentially from the cache to be allocated to each unit of data transmitting to the target storage system as a collection of data irrespective of the device specified by the host CPU 1, thereby being passed to the target external storage controller unit 4 by the section 17 of transmitting data to the target storage system.

In this way, a plurality of write data transferred from the master disk controller unit to the remote disk controller unit are unified to one. In addition, an identifier constructed of a number manage system different from the manage system of the device number used when the host CPU accesses a logical volume is allocated to the unified data as an identifier for identification used when sending the data from the master disk controller unit to the remote disk controller unit. The device number of the number manage system used when the host CPU accesses a logical volume is used directly when sending the data from the master disk controller unit to the remote disk controller unit. AS compared with this, the number of the identifiers for identification used when sending the data from the master disk controller unit to the remote disk controller unit can be enough. As a result, the identifier used when the write data from the host CPU is transferred to the remote disk controller unit can be secured, and the identifier for sending control data for transfer control can be easily ensured, whereby transfer control the master disk controller unit to the remote disk controller unit is easy.

This will be described specifically by the example of FIG. 3. Three device numbers used when the host CPU accesses a logical volume are "0, 1 and 2". The numbers are used directly as the identifier when sending the data from the master disk controller unit to the remote disk controller. In this case, all the three device numbers "0, 1, and 2" are used to send the data to the remote disk controller unit. The identifier used to transfer data for transfer control cannot be secured, and thus, the data for transfer control cannot be transferred. Here, in application of the present invention, when the identifiers for transfer can use only three numbers 0, 1 and 2, only the device numbers 0 and 1 are used for data transfer, so that the device number 2 can be used for transferring data for control.

In FIG. 3, the device number is used as the identifier for unit of data transmitting to the target storage system. The device number is used when the storage controller unit manages a data processing target as a device. The device number may be any simple number or identifier which can identify the unit of data transmitting to the target storage system. When the device number is used, the controlling method of the storage controller unit is similar to that of the prior art, and its introduction is easy. When using a region for a device number similar to that of the prior art, the number thereof is limited. Conversely, when a region to manage the device number is extended, the number limitation is reduced.

The section 17 of transmitting data to the target storage system performs transfer-processing the above-mentioned units 92a and 92b of data transmitting to the target storage system and the write data corresponding to the respective data control information unifying the units of data transmitting to the target storage system, as one piece of transfer data for each unit of data transmitting to the target storage system.

The data transferred through the channel port 11 between master and remote disk controller units and the channel port 12 between master and remote disk controller units are divided into data control information 22 and write data 23 by the section 21 of processing data from the source storage system, which are then stored into the cache memory 10. The write data 23 stored into the cache memory is written, by the section 24 of writing data to disk drive, into a target device in the remote disk unit 5 asynchronous to the timing receiving the data transferred with reference to the device number in the data control information 22.

Figure 4:
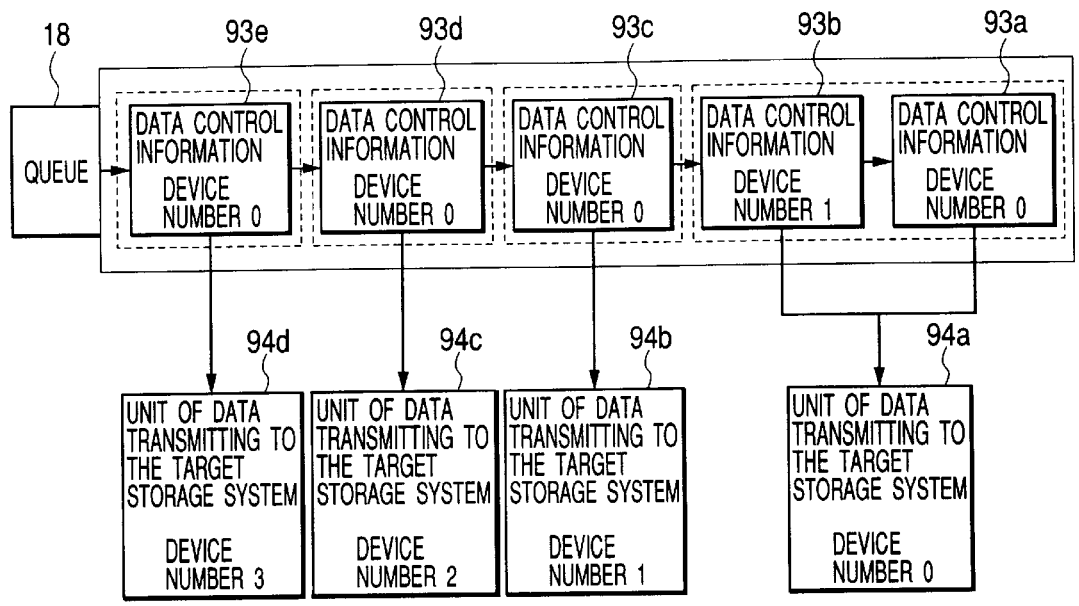
FIG. 4 shows a specific example of the scheduling processing.
Figure 5:
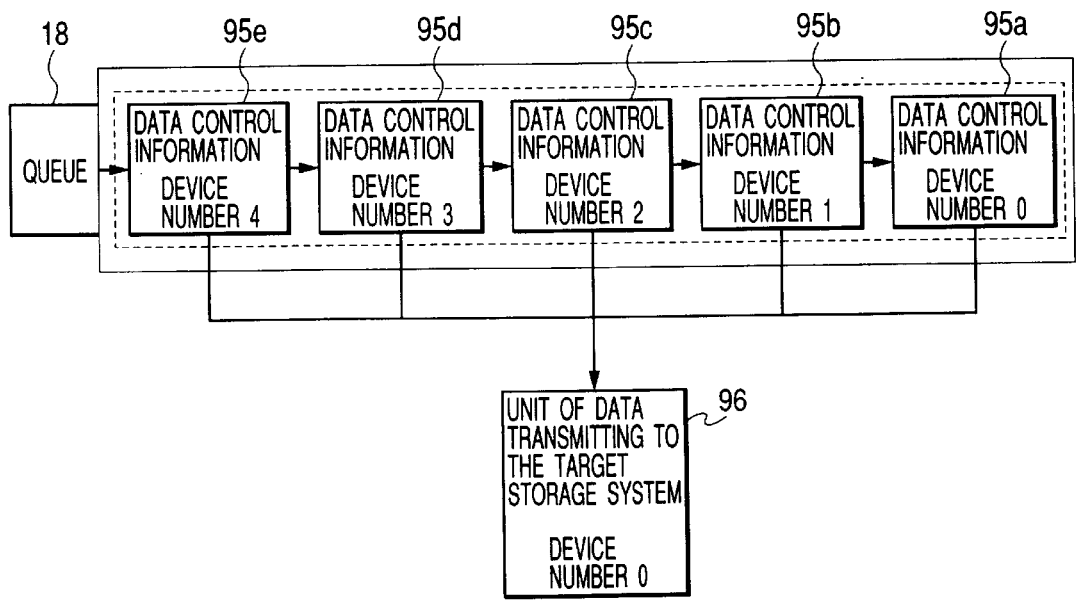
FIG. 5 shows a specific example of the scheduling processing.

FIGS. 4 and 5 show specific scheduling examples.

FIG. 4 is a scheduling example for multiplexing of data transfer. In transferring data from the master disk controller unit to the remote disk controller unit, when a plurality of data are transferred at the same time, the identifiers (device numbers) provided to the data must be separated in order to identify the data each other. Now, suppose that a plurality of writes with a target device number 0 from the host CPU subject to queuing in the queue 18. In the prior art, write data corresponding to the data control information 93a and 93b has different target device numbers, and can identify the data each other on the interface 14 between master and remote disk controller units and transfer the data at the same time. Write data corresponding to data control information 93c, 93d and 93e has the same target device number of the data control information 93a, and cannot be transferred at the same time. The data must be sent sequentially one by one with a different timing. The transfer time is thus increased. On the other hand, when the present invention is used, the data control information 93a and 93b, 93c, 93d, and 93e of the same target write data with a device number 0 in the queue 18 are respectively unified to other units 94a, 94b, 94c and 94d of data transmitting to the target storage system. Further, a device number 0 different from the number manage system of the device number accessed from the host CPU is allocated to the unit 94a of data transmitting to the target storage system, a device number 1 is allocated to the unit 94b of data transmitting to the target storage system, a device number 2 is allocated to the unit 94c of data transmitting to the target storage system, and a device number 3 is allocated to the unit 94d of data transmitting to the target storage system. As a result, the different device numbers are allocated to the units of data transmitting to the target storage system so as to be identified each other. The units of data transmitting to the target storage system can be transferred at the same time, and can be multiplex-transferred. Efficient transfer can be done as compared with the prior art.

FIG. 5 is a scheduling example to reduce overhead of data transfer. Data control information 95a, data control information 95b, data control information 95c, data control information 95d, and data control information 95e of different target write data with a device number 0, a device number 1, a device number 2, a device number 3, and a device number 4, respectively, in the queue 18 are unified to one unit 96 of data transmitting to the target storage system. The unit 96 of data transmitting to the target storage system is transferred as a device number 0 belonging to the number manage system not dependent on (or managed separately) the device number when the host CPU accesses the logical volume. As a result, in the prior art, overhead (five times in the example of FIG. 5) with transfer through the channel port caused for each sending of individual data control information. By application of the present invention, the overhead can be reduced to once with transfer of the one unit 96 of data transmitting to the target storage system. Efficient transfer can be done as compared with the prior art. As in these examples, the present invention is applied to the object so as to transfer data with changed efficient scheduling.

Figure 6:
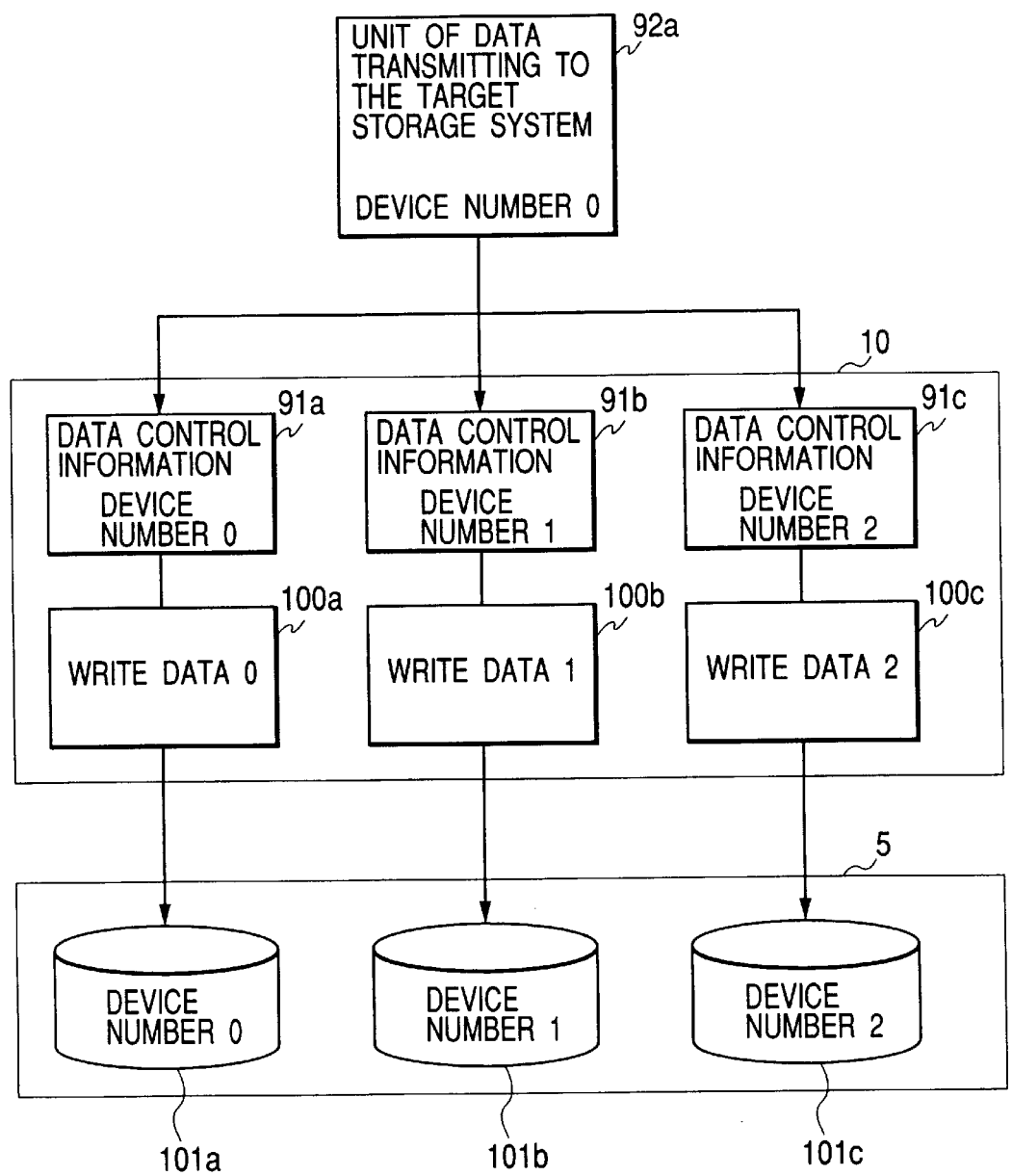
FIG. 6 shows a specific example of data write in a remote disk unit.

With FIG. 6, the operation of the remote disk controller unit 4 receiving the unit 92a of data transmitting to the target storage system will be described in detail. The section 21 of processing data from the source storage system divides the received unit 92a of data transmitting to the target storage system and a plurality pieces of data control information 91a, 91b and 91c before being unified by the scheduling processing, and stores them into the cache memory 10 together with corresponding write data 10a, 100b and 100c, respectively.

The section 24 of writing data to disk drive writes the write data 100a corresponding to the data control information 91a into a device 101a in the remote disk unit 5 specified by the target device number specified by the host CPU in the data control information 91a asynchronous to storing to the cache memory 10 by the section 21 of processing data from the source storage system. Similarly, the data control information 91b writes the write data 100b into a device 101b, and the data control information 91c writes the write data 100c into a device 101c.

As described above, according to the controlling method not dependent on a device of this embodiment, can be unified as the unit of data transmitting to the target storage system irrespective of the device number corresponding to the logical device in the remote disk unit 5. In is possible to transfer write data having the same device number corresponding to the logical device in the remote disk unit 5 as separate units of data transmitting to the target storage system, or as a unit of data transmitting to the target storage system unifying write data having different device numbers corresponding to the logical device in the remote disk unit 5. After transferring data, data can be written into a target device in the remote disk unit 5.

According to the present invention, in the process in which write data received from the host CPU is passed to the target external storage controller unit, a processing independently of the processing using the device number specified from the host CPU is done. The limitations of transferring data to the target storage subsystem can be reduced.

In addition, a different number is allocated to each of a plurality of writes to a device having the same number. Multiple processing can be done in transfer to the target storage subsystem.

Further, write data to a plurality of devices having different targets can be unified for transfer. Overhead for transfer can be reduced.

What is claimed is:

1. A method for data transfer between storage systems having a source storage system connected to a host CPU and provided with one or more source storage device units for storing data of said host CPU and a source storage controller unit for controlling said source disk storage device units, and a target storage system provided with one or more target disk storage device units for storing said data received from said source storage system and a target storage controller unit for controlling said target storage device units, comprising the steps of:

receiving a plurality of blocks of write data from said host CPU, each block having an associated first identifier allocated by said host CPU that indicates one of said source storage device units;

unifying some of said blocks of write data to produce a unit of data for transmitting to said target storage system;

allocating, to said unit of data a second identifier different from said first identifiers;

sending, to said target storage system, said unit of data;

receiving said unit of data in said target storage system;

dividing said unit of data into said some of said blocks of data; and writing some of said blocks of data into said target storage device unit in accordance with said first identifiers for specifying a target, wherein said some of said blocks of write data are stored in one or more of said target disk storage device units based on their associated first identifiers.

2. The method according to claim 1, wherein each of said source storage device units is a logical volume identified by a device number, wherein each of said first identifiers is a device number.

3. The method according to claim 1, further comprising steps of:

temporarily storing said blocks of write data in a cache memory of said source storage system, each block of write data being stored as a data portion and a data control information portion, said data control information portion including said first identifier; and temporarily storing said unit block of data in a cache memory of said target storage system.

4. A method for transferring data sent from a host CPU between a source storage system and a target storage system, both of which has a cache memory to temporarily store data, and both of which comprises a plurality of disk storage devices defined as logical volumes to store the data therein, the method comprising steps of:

receiving a plurality of blocks of write data from said host CPU, said blocks of write data including first logical volume numbers indicating said logical volumes in said target storage system, said first logical volume numbers assigned by said host CPU;

storing temporarily said blocks of write data in said cache memory of said source storage system;

allocating one or more second logical volume numbers to groups of said blocks of data, said second logical volume numbers determined independently of said first logical volume numbers;

sending said groups of said blocks of data and their corresponding second logical volume numbers to said target storage system;

receiving said blocks of data in said target storage system;

temporarily storing said blocks of data in said cache memory of said target storage system;

allocating to said blocks of data said first logical volume numbers; and storing said blocks of data in said disk storage devices of said target storage system based said first logical volume numbers.

* * * * *